US006828553B2

(12) United States Patent
Weiss

(10) Patent No.: US 6,828,553 B2
(45) Date of Patent: Dec. 7, 2004

(54) COMPACT VERY HIGH RESOLUTION TIME-OF FLIGHT MASS SPECTROMETER

(75) Inventor: Gerhard Weiss, Weyhe (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 10/688,207

(22) Filed: Oct. 17, 2003

(65) Prior Publication Data

US 2004/0144919 A1 Jul. 29, 2004

(30) Foreign Application Priority Data

Oct. 19, 2002 (DE) ........................................ 102 48 814

(51) Int. Cl.[7] .......................... B01D 59/44; H01J 39/34; H01T 49/00

(52) U.S. Cl. ................... 250/287; 250/396 R; 250/294; 250/299; 315/500; 315/501; 315/502; 315/503; 315/504; 315/505

(58) Field of Search ................................ 250/287, 294, 250/299, 296 R; 315/500–505

(56) References Cited

U.S. PATENT DOCUMENTS

| | | | | |
|---|---|---|---|---|
| 3,863,068 A | | 1/1975 | Poschenrieder | |
| 5,714,850 A | * | 2/1998 | Kitamura et al. | 315/507 |
| 6,214,592 B1 | * | 4/2001 | Crouzet et al. | 435/129 |
| 6,300,625 B1 | * | 10/2001 | Ishihara | 250/287 |

FOREIGN PATENT DOCUMENTS

| | | |
|---|---|---|
| DE | 2045 338 A1 | 9/1970 |
| JP | 11135061 A | 5/1999 |
| JP | 11195398 A | 7/1999 |

OTHER PUBLICATIONS

GB Search Report, Apr. 27, 2004.

Wiley, W.C., et al., "Time–of–Flight Mass Spectrometer with Improved Resolution", The Review of Scientific Instruments, vol. 26, No. 12, Bendix Aviation Corporation Research Laboratories, Dec. 1955, pp. 1150–1157.

Bakker, J.M., "The Time–Focusing Principle: A Double–Focusing Design For Time–Of–Flight Mass Spectrometers", International Journal of Mass Spectrometry and Ion Physics, vol. 6, Elsevier Publishing Company, Amsterdam, 1971, pp. 291–295.

Sysoev, Alexander A., et al., "Direct sampling time–offlight mass Spectrometers for technological analysis", Fresenius J. Anal Chem, vol. 361, Springer–Verlag, 1998, pp.261–266.

Sysoev, A.A., "Time–of–flight analysers with sector fields: advances and prospects", Eur. J. Mass Spectrom, vol. 6, IM Publications, 2000, pp. 501–513.

Sakurai, T. et al., "A New Time–Of–Flight Mass Spectrometer", International Journal of Mass Spectrometry and Ion Processes, vol. 66, No. 3, Elsevier Science Publishers B.V., 1985, 283–290.

* cited by examiner

*Primary Examiner*—John R. Lee
*Assistant Examiner*—Bernard E. Souw

(57) ABSTRACT

The invention relates to a compact time-of-flight mass spectrometer which enables very accurate mass determinations. The invention consists of a method of producing a high resolution by means of a long flight path, where the ion beam repeatedly sweeps a figure of eight in two opposed cylindrical capacitors, each of 254.56°, and the linear ion beam paths between the cylindrical capacitors are extended virtually by a change in potential so as to cause a time focusing with respect to an initial energy spread.

4 Claims, 2 Drawing Sheets

COMPACT VERY HIGH RESOLUTION TIME-OF FLIGHT MASS SPECTROMETER

FIELD OF THE INVENTION

The invention relates to a compact time-of-flight mass spectrometer which enables very accurate mass determinations.

BACKGROUND OF THE INVENTION

The best choice of mass spectrometer for measuring the mass of large molecules, as undertaken particularly in biochemistry, is a time-of-flight mass spectrometer because it does not suffer from the limited mass range of other mass spectrometers. Time-of-flight mass spectrometers are frequently abbreviated to TOF or TOF-MS.

Two different types of time-of-flight mass spectrometer have been developed. The first type comprises time-of-flight mass spectrometers for measuring ions which are generated in pulses in a tiny volume and accelerated axially into the flight path, for example with ionization by matrix-assisted laser desorption, MALDI for short, a method of ionization suitable for ionizing large molecules.

The second type comprises time-of-flight mass spectrometers for the continuous injection of an ion beam, one section of which is ejected as a pulse in a "pulser" transversely to the direction of injection and forced to fly through a mass spectrometer with reflector as a linearly spread ion beam lying transverse to the direction of flight, as the schematic in FIG. 1 shows. A ribbon-shaped ion beam is therefore generated in which ions of the same type, i.e. with the same mass-to-charge ratio, form a transverse front. This second type of time-of-flight mass spectrometer is known for short as an "Orthogonal Time-of-Flight Mass Spectrometer" (OTOF); it is mainly used in conjunction with out-of-vacuum ionization. The most frequently used type of ionization for this type of mass spectrometer is electrospray ionization (ESI). Electrospray ionization (ESI) is suitable for ionizing large molecules in much the same way as MALDI. It is also possible to use other types of ionization, for example chemical ionization at atmospheric pressure (APCI), photoionization at atmospheric pressure (APPI) or matrix-assisted laser desorption at atmospheric pressure (AP-MALDI). Ions generated in-vacuum can also be used. Before they enter the OTOF, the ions can also be selected and fragmented in appropriate devices so that the fragments can be used to improve the characterization of the substances.

In this second type of time-of-flight mass spectrometer, a large number of spectra, each with relatively low ion counts, are generated by a very high number of pulses per unit of time (up to 20,000 pulses per second) in order to utilize the ions of the continuous ion beam as effectively as possible.

As with all mass spectrometers, with a time-of-flight mass spectrometer one can only determine the ratio of the mass m of the ion to the number z of elementary charges which the ion carries. Any subsequent reference to "specific mass" or quite simply to "mass" on its own always means the ratio m/z. If, by way of exception, "mass" in the following text is to be taken to mean the physical dimension of the mass, it will be specifically called molecular mass The unit of molecular mass m is the "unified atomic mass unit", abbreviated to "u", usually simply termed "mass unit" or "atomic mass unit". In biochemistry and molecular biology, the unit "Dalton" ("Da") is still frequently used. The unit of specific mass m/z is "atomic mass unit per elementary charge" or "Dalton per elementary charge", where the elementary charge is the charge on an electron (if negative) or proton (if positive).

FIG. 1 shows the principle of a reflector time-of-flight mass spectrometer with orthogonal ion injection. In the pulser, the ions are accelerated transversely to their direction of injection (x-direction); the direction of acceleration is called the y-direction. The ions leave the pulser through slits in slit diaphragms, which can also be used for angular focusing in a z-direction which is at right angles to the x- and y-directions. After being accelerated, however, the ions have a direction which lies between the y-direction and the x-direction, since they fully retain their original velocity in the x-direction. The angle to the y-direction is $\alpha=\arctan\sqrt{(E_x/E_y)}$, where $E_x$ is the kinetic energy of the ions in the primary beam in the x-direction and $E_y$ the energy of the ions after being accelerated in the y-direction The direction in which the ions fly after the pulsed ejection is independent of the mass of the ions.

The ions which have left the pulser now form a broad ribbon, where ions of the same type (the same specific mass m/z) are all to be found in one front, which has the width of the beam in the pulser: Light ions fly faster, heavy ones slower, but all fly in the same direction, with the exception of possible slight differences in direction which can arise as a result of the slightly different kinetic energies $E_x$ of the ions as they are injected into the pulser. These ions are therefore injected as monoenergetically as possible. The field-free flight path must be completely surrounded by the accelerating potential in order not to disturb the ions in flight.

As reported by W. C. Wiley and I. H. McLaren (Rev Sci Instrum 26 (1955) 1150), ions with the same specific mass which are at different locations of the beam cross section can be time-of-flight focused with respect to their different start locations by selecting the field in the pulser in such a way when switching on the outpulsing voltage that the ions furthest away are given a slightly higher acceleration energy to enable them to catch up with the leading ions again in a time-of-flight focal point. The time-of-flight focal point can be positioned as desired by means of the outpulse field strength in the pulser. This converts the initial spatial dispersion of the ions into an energy dispersion. The energy dispersion is compensated by the reflector in the known way.

To scan ion beams in time-of-flight spectrometers, instruments currently commercially available incorporate so-called channel plate secondary-electron multipliers by which the ion beams are amplified; these amplified currents are fed into fast transient recorders. The fast transient recorders digitize the amplified ion beams at the rate of one to four gigahertz in analog-to-digital converters with a signal resolution of usually eight bits.

In order to achieve a high resolution, the mass spectrometers (both axial and orthogonal time-of-flight mass spectrometers) are equipped with at least one energy focusing reflector which reflects the outpulsed ion beam toward the ion detector, thereby accurately time focusing ions of the same mass but slightly different initial kinetic energy in the y-direction onto the large-area detector. The ions fly out of the (last) reflector towards a detector which, in the case of orthogonal time-of-flight mass spectrometers, must be of the same width as the ion beam in order to be able to measure all incident ions. This detector also must be aligned parallel to the x-direction, as shown in FIG. 1, in order to also concurrently detect the front of flying ions of the same mass.

The resolution R and the mass accuracy of a time-of-flight mass spectrometer are proportional to the flight distance. It is therefore possible to increase the resolution by selecting a very long flight tube or by introducing several reflectors to produce multiple reflections. For example, with a flight path of one and a half meters one can achieve a mass resolution of around $R=m/\Delta m=10{,}000$; with around six meters, a mass resolution of $R=m/\Delta m=40{,}000$ (where $\Delta m$ is the line width of the ion signal at half maximum, measured in mass units).

Flight tubes of several meters in length are very inconvenient because they result in unwieldy instruments. Multiple reflections are also problematic, however, because, until now, the angular focusings of the divergent ion beam, which are actually very desirable, have not been satisfactorily solved.

It is, however, also known that time-of-flight mass spectrometers exist which incorporate cylindrical capacitors in the flight path, thus enabling a small instrument to have a long flight path. In this case, a cylindrical capacitor offers angular focusing (for the angle $\phi$, which lies in a plane which intersects the cylinder axis at right angles), angular focusing with respect to energy spreads and time-of-flight focusing with respect to the initial angular spreads for ions of the same specific mass, which can be used for long flight paths.

J. M. B. Bakker (Int. J. Mass Spectrom. Ion Phys. 6(1971)291–295) presents an instrument which achieves energy spread focusing using a combination of straight flight paths with flight paths in cylindrical capacitors. In this paper, both the angular focusing for $\phi$ and the angular focusing with respect to energy spreads in cylindrical capacitors seem to be known, and it is shown that for purely energy focusing, one can shorten the rotational angle for the energy focusing using a combination of linear and circular paths.—Combinations of linear and circular flight paths for angular focusings have been known for many decades and details can be found in relevant text books.—A. A. Sysoev et al. (Fresenius J. Anal. Chem. 361 (1998) 261–266) present an instrument which incorporates a cylindrical capacitor of 509° whose energy dispersion appears to be neutralized again by means of a linear continuation of the path to the detector. The 509° are only depicted in a diagram, the precise conditions of the energy focusing are not given.—In an ion-optical paper on time-of-flight mass spectrometers with electric sector fields (cylindrical capacitors), A. A. Sysoev (Eur. J. Mass Spectrom. 6 (2000) 501–513) demonstrates solutions for using shorter circular trajectories in cylindrical capacitors in combination with linear flight paths.

In a cylindrical capacitor, ions which enter monoenergetically in a point undergo angular focusing with respect to the angle of incidence $\Phi$ after $127.28°=180°/\sqrt{2}$; ions of the same specific mass experience thereby a time-of-flight dispersion, however. This focusing means that ions with different starting angles come together again in the trajectory at one focal point, but ions of the same mass do not arrive there simultaneously because the path lengths for the ions of different angles are different. We will call this type of focusing "angular focusing with time-of-flight dispersion".

After sweeping this angle twice, i.e. after sweeping an angle of $254.56°=2\times127.28°(360°/\sqrt{2})$, an angular focusing then occurs again, but this time together with a time-of-flight focusing (if a time-of-flight focusing was present at the beginning of the first angle), since the time-of-flight dispersion of the first half is precisely compensated for. We will call this focusing "angular focusing with time-of-flight focusing".

In a cylindrical capacitor, ions which enter in a point and are time-of-flight focused but energy dispersive become spatially focused with respect to their energy spread after sweeping an angle of $254.56°=2\times127.28\ °=360°/\sqrt{2}$; ions of the same specific mass experience a time-of-flight dispersion as a result, however. This focusing means that ions with different energies of incidence come together again in the trajectory at one focal point, but ions of the same mass do not arrive there simultaneously because the path lengths for the ions with different energies are different. We will call this type of focusing "energy focusing with time-of-flight dispersion". After this special angle there thus occurs an "angular focusing with time-of-flight dispersion" and an "energy focusing with time-of-flight dispersion".

After sweeping this angle twice, i.e. after sweeping an angle of $509.12°=2\times254.56°=360°\times\sqrt{2}$, an energy focusing then occurs again, but unfortunately this time without the time-of-flight focusing which occurs with angular focusing. The time-of-flight dispersions do not compensate each other but double instead. In the case of cylindrical capacitors it is therefore generally not possible to achieve an "energy focusing with time-of-flight focusing".

The time-of-flight dispersion of the energy focusing after 254.56° is worth mentioning because here, the lower energy, i.e. slower, ions fly ahead and the higher energy ions arrive later. It is thus possible to again compensate the energy dispersion with a linear flight path. This flight path is, however, relatively long so that it is not possible to build a particularly small mass spectrometer simply by combining a cylindrical capacitor and a linear flight path.

SUMMARY OF THE INVENTION

One approach begins with the idea of positioning two cylindrical capacitors, each with 254.56°, opposite each other in such a way that the trajectory through both cylindrical capacitors resembles a "figure 8". In each case, straight flight paths, whose length is determined by the radius of the cylindrical capacitors, are then created between the circular trajectories in the cylindrical capacitors. However, these straight flight paths are unfortunately too short to compensate the time-of-flight dispersion which arises as a result of the sweep through the cylindrical capacitors. A time-of-flight dispersion remains which increases with each repeated sweep through the "8" and which can only be compensated by a longer, linear flight path. The longer, linear flight path prevents the construction of a very small instrument.

The invention involves virtually increasing the lengths of the straight flight paths between the two cylindrical capacitors for the ions, in order to compensate the time-of-flight dispersion of the cylindrical capacitor with 254.56° by means of this internal flight path. The virtual extension of the linear flight path is caused by a flight path which is at a different potential referred to the mid potential in the cylindrical capacitors. The ions must be decelerated as they emerge from the cylindrical capacitor and accelerated again as they enter the next cylindrical capacitor. The ions therefore fly slower in this flight path and, since the energy spread of the ions remains constant, the faster ions can catch up with the slower ones on a shorter path. With a simple adjustment of the potential of the linear flight path, optimum compensation of the time-of-flight dispersion can be achieved.

Special corrective potentials must be inserted between cylindrical capacitor and straight flight paths in order to achieve a good transition in spite of the deceleration. The corrective potentials are applied to corrective electrodes and consist of one pair of electrodes to compensate for the scattering potential of the cylindrical capacitor and one pair of electrodes which forms an ion lens.

Ions which are parallel and time focused when they enter one of the cylindrical capacitors experience two angular focal points each time they sweep through a cylindrical capacitor and are again parallel each time they emerge. (Other types of operation are also possible and are described below). At the end of each of the linear flight paths (before the ions enter the next cylindrical capacitor) a time-of-flight focusing of ions of the same mass is always achieved.

Therefore, if a pulsed ion source is mounted in such a way that a parallel, time focused entry of the ions into the first cylindrical capacitor is achieved then, at the end of the linear flight path which was swept last, a detector can measure a high resolution mass spectrum. Further possible geometries for the operation are discussed below. In particular, an ion beam can be helically spiraled in each cylindrical capacitor by injecting it at a slightly oblique angle (with a motion component in the direction of the axis of the cylindrical capacitors) so that after multiple sweeps, the ion source and detector do not cause an obstruction.

This invention can be used to construct different configurations of relatively small time-of-flight mass spectrometers; in each case the configuration depends greatly on the type of ion generation and the planned mass resolution. It is particularly worth mentioning, for example, an embodiment for ions of a continuous ion beam in the y-direction parallel to the axial direction of the cylindrical capacitor, from which the ions of individual sections of the ion beam are pulser injected in the form of an ion ribbon in the y-direction tangentially into the cylindrical capacitor. The ions thus accelerated fly obliquely out of the pulser in the form of an ion ribbon, and the initial velocity of the ions in the x-direction is maintained. As already described above, the angle to the y-direction is $\alpha=\arctan\sqrt{(E_x E_y)}$, where $E_x$ is the kinetic energy of the ions in the primary beam in the x-direction and $E_y$ the energy of the ions after being accelerated in the y-direction. When the cylindrical capacitor is correctly dimensioned, this angle $\alpha$ produces the helical spiraling of the ion trajectory within each cylindrical capacitor.

It is not necessary that the pulser and detector are mounted between the cylindrical capacitors. By moving the two cylindrical capacitors axially with respect to each other, the pulser or detector can also be further away from the entrance into the cylindrical capacitor than the length of the straight path between the two cylindrical capacitors; the ion beam is led past the end of the cylindrical capacitors in each case. The overcompensation of the time-of-flight dispersion by the longer path can thus be compensated by adjusting the potential of the straight flight paths because the time-of-flight compensation is achieved by the sum and does not depend on the time-of-flight compensation of the individual paths.

BRIEF DESCRIPTION OF THE DRAWINGS

The above and further advantages of the invention may be better understood by referring to the following description in conjunction with the accompanying drawings in which.

DETAILED DESCRIPTION

Figure 1:
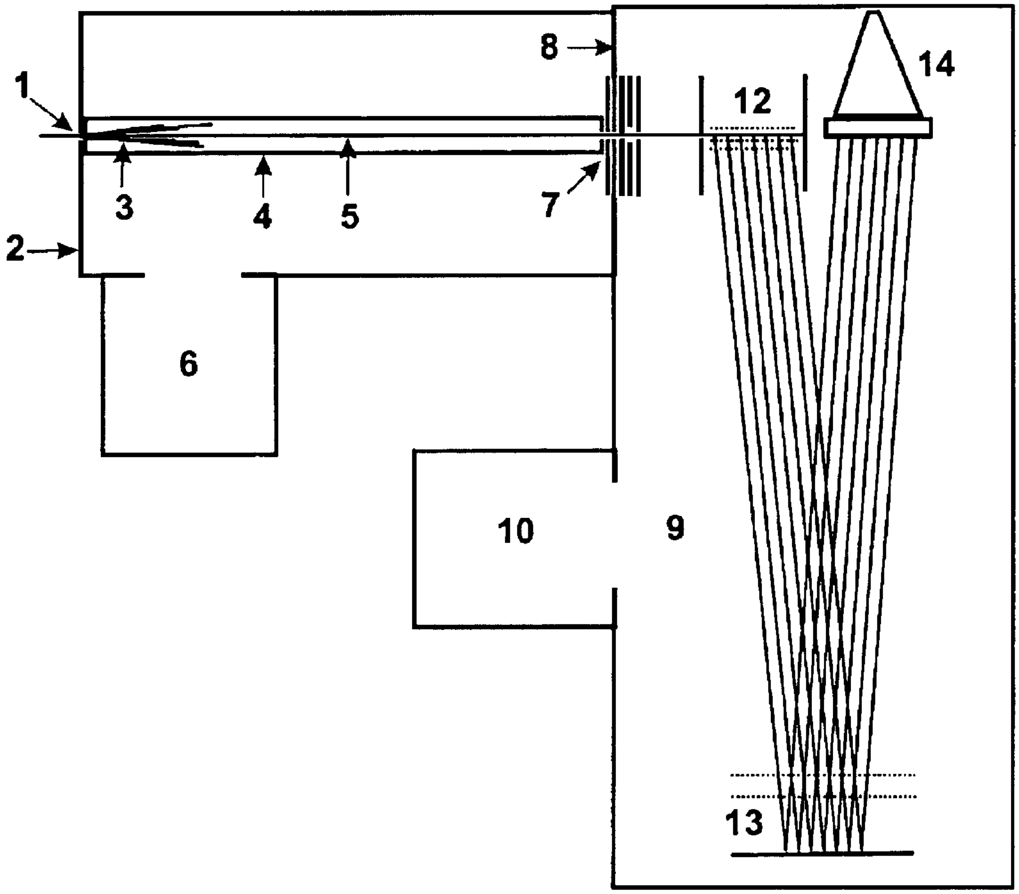
FIG. 1 shows a schematic diagram of a conventional time-of-flight mass spectrometer with orthogonal ion injection.
Figure 2:
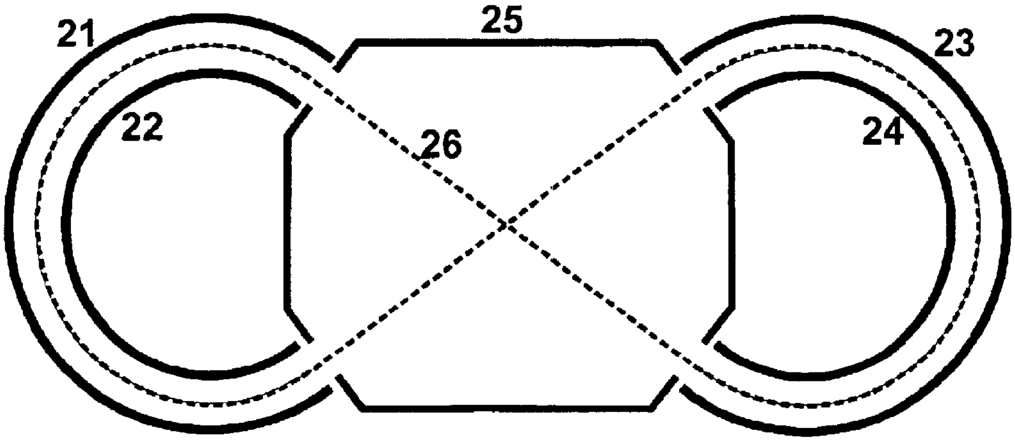
FIG. 2, shows a set of cylindrical capacitors positioned opposite each other so as to create an ion trajectory resembling a "figure 8."

FIG. 1 shows a schematic diagram of a conventional time-of-flight mass spectrometer with orthogonal ion injection. Through an opening (1) in a vacuum chamber (2), a beam (3) of ions with different initial energies and initial directions enters an ion guide system (4) located in a gastight container. Damping gas also enters the ion guide system simultaneously. The ions entering the gas are decelerated by collisions. In the ion guide system there exists a pseudopotential for the ions which is lowest on the axis (5), and so the ions collect on the axis (5). The ions spread out along the axis (5) up to the end of the ion guide system (4). The gas from the ion guide system is evacuated by the vacuum pump (6) on the vacuum chamber (2).

At the end of the ion guide system (4) there is a puller lens system (7). An apertured diaphragm of this puller lens system is integrated into the wall (8) between vacuum chamber (2) for the ion guide system (4) and vacuum chamber (9) for the time-of-flight mass spectrometer. The latter is evacuated by means of a vacuum pump (10). In this schematic the puller lens system (7) consists of five apertured diaphragms; it extracts the ions from the ion guide system (4) and forms a thin ion beam with small phase volume which is focused into the pulser (12). The ion beam is injected into the pulser in the x-direction. When the pulser is full with ions in transit with the preferred mass for analysis, then a short voltage pulse accelerates a broad packet of ions transversely to the previous direction of flight in the y-direction and forms a broad ion beam which is reflected in a reflector (13) and measured with high time resolution by an ion detector (14). In the ion detector (14) the ion signal, which is amplified in a secondary-electron multiplier in the form of a double multichannel plate, is transferred capacitively to a 50Ω cone. This previously amplified signal is transmitted via a 50Ω cable to an amplifier. The 50Ω cone serves to terminate the cable at the input side so that no signal reflections can occur here.

In this schematic, reflector (13) and detector (14) are aligned exactly parallel to the x-axis of the ions injected into the pulser. The distance between detector (14) and pulser (12) determines the maximum degree of utilization for ions from the thin ion beam.

In contrast, we now discuss a first embodiment according to this invention. This embodiment operates as a time-of-flight mass spectrometer with orthogonal ion injection of a continuous ion beam, for example for an ion beam from an ionization by electrospray ionization (ESI). Anyone skilled in the art can also transfer the principle to other ion sources with other types of ionization.

Figure 4:
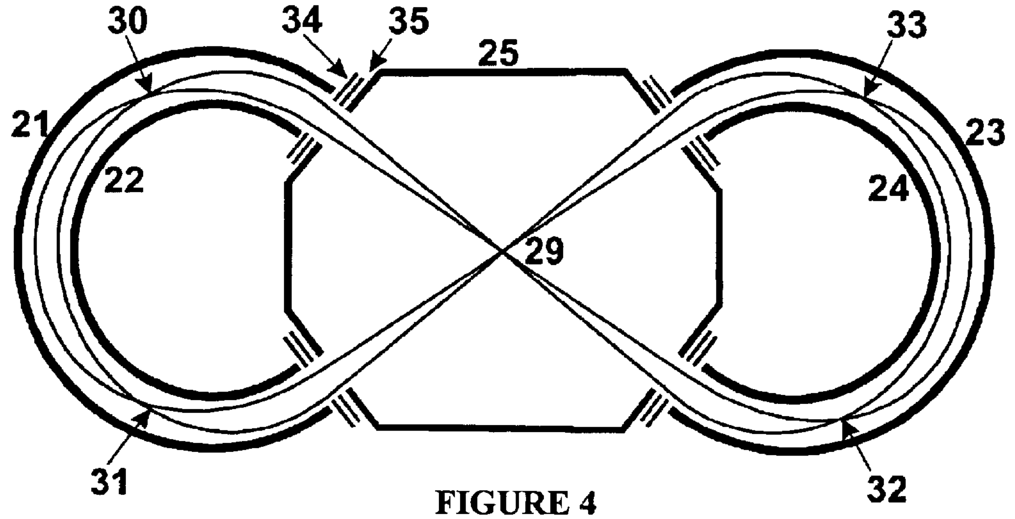
FIG. 4 illustrates a mode in which the lens electrodes (35) generate a focal point (29) at the center of the system.
Figure 5:
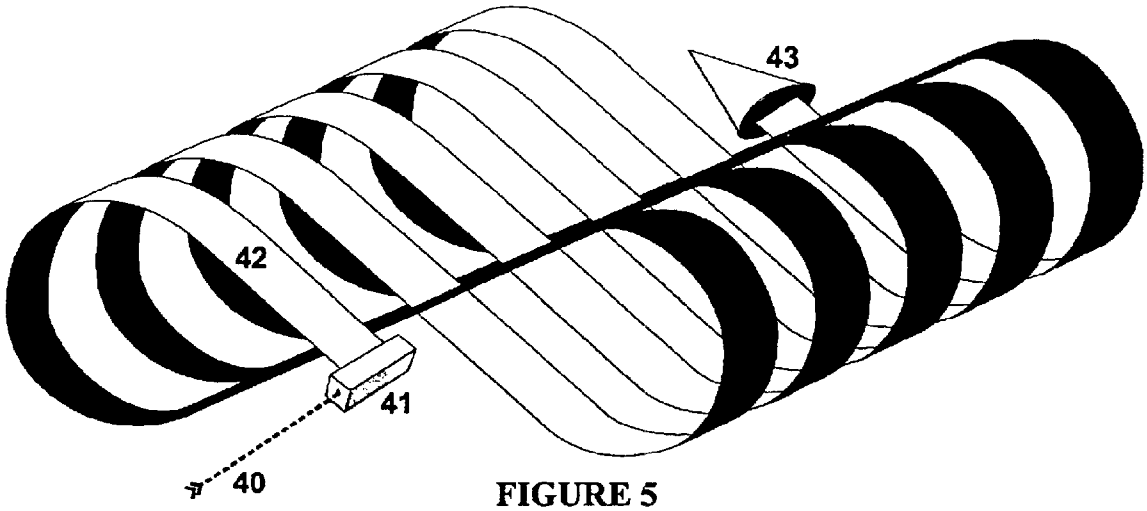
FIG. 5 is the schematic representation of the ion beam of a time-of-flight mass spectrometer for orthogonal ion injection according to this invention.

The principle of ion beam guidance is shown in FIG. 5, the details of how to focus the ion beam with respect to the angle of injection can be seen in FIG. 4. The plates of the cylindrical capacitors (21), (22), (23) and (24) as well as the housing (25) extend over the complete depth of the trajectory in the x-direction, the direction of the primary ion beam (40), from the pulser (41) to the detector (43) in FIG. 5.

As is the case with a conventional time-of-flight mass spectrometer with orthogonal ion injection, as shown in FIG. 1, the primary ion beam is initially damped in an RF ion guide system filled with collision gas at a pressure of around $10^{-2}$ Pascal in such a way that the ions generated are practically monoenergetic. An accelerating lens then forms them into a thin ion beam (40) which is merged into the pulser (41) of the mass spectrometer. The ions here have a kinetic energy $E_x$ which can be adjusted to between around 20 and 40 electron volts. We call the direction of this primary ion beam the x-direction. This pulser is made up of a series of slit diaphragms which enable the ion beam to be accelerated as a pulse in the y-direction, which is at right angles to the primary x-direction. The slit diaphragms are more effective than the pulser grid (12) in FIG. 1; they allow the formation of a ribbon-shaped beam approximately two centimeters wide with a very slight divergence and which appears to originate from a very small, linear, extended originating location. The kinetic energy $E_y$ of the ions transverse to the primary direction is approximately eight kilovolts.

After being accelerated in the y-direction, the ion beam ribbon has a direction which lies between the y-direction and the x-direction, since the ions fully retain their original velocity in the x-direction. The angle to the y-direction is $\alpha=\arctan \sqrt{(E_x E_y)}$, where $E_x$ is the kinetic energy of the ions in the primary beam in the x-direction and $E_y$ the energy of the ions after being accelerated in the y-direction. The direction in which the ions fly after the pulsed ejection is independent of the mass of the ions. The angle $\alpha$ can be set by selecting the primary energy $E_x$. The angle $\alpha$ causes the ribbon-shaped ion beam to be helically spiraled each time it flies through one of the cylindrical capacitors; each of the linear sections of the ion beam also has a forward thrust in the x-direction, i.e. in the direction of the axis of the cylindrical capacitors.

If this pulser is arranged in the mass spectrometer is such a way that it positions the originating location at the cross-over point (29) of FIG. 4, then the ribbon-shaped ion beam can be injected into the cylindrical capacitor (21, 22) as a slightly divergent ion beam (36) as shown in FIG. 4. Since the beam must be parallel when it enters here, the lens (35) is adjusted so that it transforms the slightly divergent beam into a parallel beam. The electrode pair (34) is supplied with a slightly asymmetric potential whose sole purpose is to compensate the scatter field of the cylindrical capacitor (21, 22) outside the boundary. This ion-optical trick is familiar to anyone skilled in the art. During the figure-of-8 path through the cylindrical capacitors the forward thrust in the x-direction is maintained, resulting in the trajectory shown in FIG. 5.

In this case, the pulser can be operated to extract ions from different initial positions transversely to the primary ion beam so that these ions enter the first cylindrical capacitor at exactly the same time, although with a slight energy dispersion; this transforms the spatial distribution into an energy distribution. The resulting energy distribution again causes a time-of-flight dispersion for each sweep of one of the cylindrical capacitors which has to be compensated by a corresponding straight section of trajectory.

The ion beam now follows the path shown in FIG. 4. Each time it sweeps through one of the two cylindrical capacitors it undergoes two angular focusings. In each cylindrical capacitor, a total of one angular focusing with time-of-flight focusing takes place and this has the effect of making the beam, which is parallel when it enters, still parallel as it emerges, and ensures that no time-of-flight dispersion of ions with different entry angles occurs, provided that these ions have the same mass and the same initial energy. Each time it sweeps through one of the two cylindrical capacitors the ion beam also undergoes a spatial focusing with respect to the spread of the initial energies, i.e. an energy focusing with time-of-flight dispersion. This means that ions with different initial energies which are parallel on entry are also perfectly parallel when they emerge again, although at slightly different times.

According to the invention, this time-of-flight dispersion is now compensated again on the linear flight paths by flying through the linear sections with a different kinetic energy to the kinetic energy for the circular sections in the cylindrical capacitors. This corresponds to a virtual extension of this section.

In the pulser, the ions receive a kinetic energy of eight kilovolts, for example. On entering the cylindrical capacitor, an acceleration of approximately 2.5 kilovolts is imparted to them in the region of the lens and the corrective electrodes. This additional acceleration can be finely adjusted via the potentials of the housing (25) and the potential of the cylindrical capacitor plates (21), (22), (23) and (24). On emerging from the cylindrical capacitor the ions are accordingly decelerated once again to eight kilovolts. Acceleration and deceleration occur in this way each time the ions enter and emerge.

In addition, the lens (35) causes a transition from parallel beam to slightly divergent beam and vice versa each time the ions enter and emerge, as can be seen in FIG. 4. It is preferable if the lens takes the form of a long slit lens (cylinder lens) which extends over the complete depth of the cylindrical capacitors. The corrective electrodes also take the form of long electrodes. For each section it is also possible to use individual lens diaphragms and corrective diaphragms, however.

As is the case with the pulser, the detector (43) can also be mounted in the center of the system although this arrangement is neither imperative nor justified on the grounds that it compensates the time-of-flight dispersion. If the arrangement is operated so that a straight section exactly compensates the time-of-flight dispersion of the previous section of flight in the cylindrical capacitor in each case, then at this central point there is no time-of-flight focusing for the detector, since only half a path has been swept since last emerging from a cylindrical capacitor. The time-of-flight focusing can easily be set up, however, by finely adjusting the potential between the housing (25) and the cylindrical capacitors, since it is not necessary to assign the compensations on the straight sections to the respective time-of-flight trajectories passed through in one of the cylindrical capacitors. Only the sum of the compensations must be correct.

Pulser and detector can also lie outside the housing (25) if the beam is led past the end of one of the cylindrical capacitors in each case. Hence the detector can also be mounted at any position along the straight flight path outside the cylindrical capacitor; the time-of-flight focusing can be set via the potential difference between the flight potential in the cylindrical capacitor and in the housing.

An instrument with a trajectory as shown in FIG. 5 can easily be constructed as a benchtop instrument. When the radius of the ion trajectory in both cylindrical capacitors is nine centimeters, the instrument can be accommodated in a relatively small vacuum housing measuring 50 centimeters wide, 50 centimeters deep and 25 centimeters high and for a total flight path length of around six meters, it should provide a mass resolution of more than R=40,000. Previous experience has shown that the mass can be determined to within 1/10 to 1/20 of the signal width. The mass determination may be achieved to within an accuracy of one to two millionths of the mass (1–2 ppm). This relatively simple benchtop instrument is therefore highly accurate given its relatively modest size.

Figure 3:
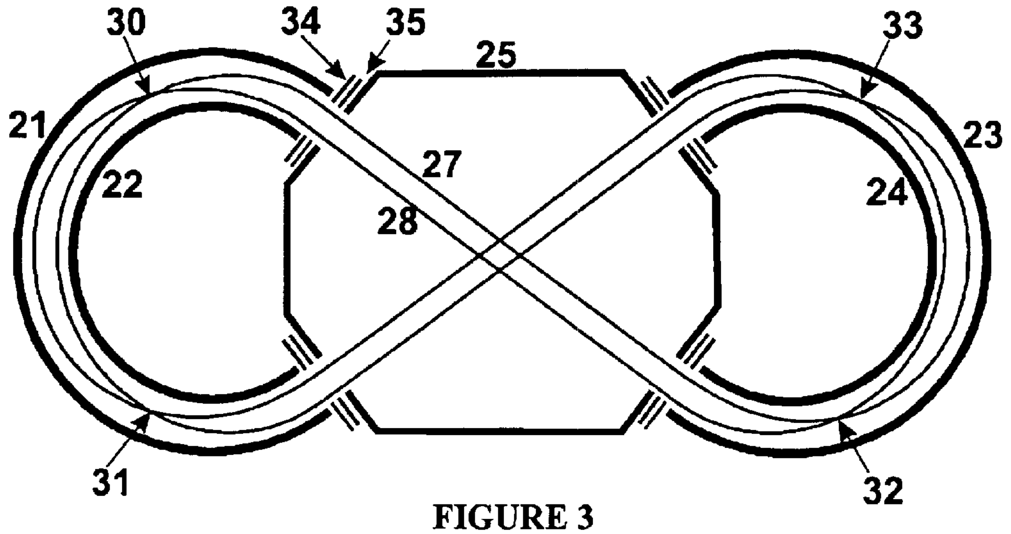
FIG. 3 shows a refinement of the arrangement shown in FIG. 2, achieved by adding a pair of corrective electrodes (34) and a pair of lens electrodes (35).

There are also other possibilities for the trajectory through the system apart from those shown in FIGS. 3 and 4. For example, the angular focal points can also lie at the entrance, in the middle or at the exit of the cylindrical capacitors. This requires additional lenses in the housing to focus the focal points on the exit side onto the entrances again.

The use of mass spectrometers such as this is not limited to ion sources which supply a continuous ion beam. Ion sources which use matrix-assisted laser desorption for the ionization can also be used, although they have a somewhat different construction.

When matrix-assisted laser desorption is used for the ionization, analyte molecules on a sample support plate are embedded into small crystals of a matrix substance. Bombarding the crystal conglomerate with a pulse of laser light causes some of the matrix material to vaporize and form a small plasma cloud, blowing analyte molecules into the plasma cloud and ionizing them. This ionization can take place outside the vacuum system although here, ionization in the vacuum system is considered. The plasma cloud expands very rapidly in the vacuum, within tens of nanoseconds, the friction hereby imparting different accelerations to the ions. After a short delay time, the faster ions are further away from the sample support plate; if an accelerating field with a potential gradient is now switched on, slower ions—nearer to the sample support plate—receive a slightly higher additional energy than the fast ones. The ions which were originally slower can now catch up with the ions which were originally faster in a time focus. The potential gradient and the delay time can thus be used to achieve an energy focusing with time focusing whose focal point can be set at a distance of between 5 and 30 centimeters away from the sample support plate. This focusing procedure is called SVCF (space velocity correlation focusing), DE (delayed extraction) or PIE (pulsed ion extraction).

On the other hand, the ions can be generated in the center (29) of the ion beam trajectory, although this generates a beam which is string-shaped rather than ribbon-shaped. Ions can also be generated at other locations; in these cases the ions are injected into the system in the direction of the primary ion beam (40) and are guided by an ion reflector in the first cylindrical capacitor instead of by a pulser (41).

Here, the accelerating optical system of the MALDI ion source can also contain a lens for an angular focusing of the ion beam, which is slightly divergent as a result of the explosive expansion of the plasma cloud; by using two crossed cylinder lenses it is even possible to make the focal lengths in two divergent planes at right angles to each other, different. As an example, it is possible in this way to focus on the entrance point of the cylindrical capacitor in the plane transverse to the axis of the cylindrical capacitor, whereas in the other direction one tries to generate a beam which is as parallel as possible, and which forms as narrow an ion beam as possible at the emergence point.

In principle, the ion beam thus generated then follows the trajectory (42) in FIG. 5, although the ion beam is string-shaped rather than ribbon-shaped.

For an accelerating voltage of 25 kilovolts, MALDI ions with a specific mass of 5,000 dalton per elementary charge have a flight time of just under 200 microseconds. A laser pulse rate of 50,000 pulses per second could therefore be applied here before overlapping of the spectra occurs. In practice, however, a maximum of 200 pulses per second is used, and so no deviation in the mode of operation is to be expected as a result of the long flight path.

What is claimed is:

1. Time-of-flight mass spectrometer, comprising:

(a) two pairs of cylindrical surfaces, each covering a 254.56" curvature angle, each pair forming the inner and outer electrodes of a capacitor, whereby the two cylindrical capacitors are supplied with deflecting potentials for guiding ions and positioned in such a way that the flight paths of the ions consist of circular and linear sections that combine to form a figure 8; and (b) an electrically conductive housing, which encloses the linear sections of the flight paths between the two cylindrical capacitors and has a potential that is different than the mid potential between the capacitors.

2. Time-of-flight mass spectrometer according to claim 1 wherein between each cylindrical capacitor and the electrically conductive housing, slit diaphragms are mounted which act as ion-optical slit lenses.

3. Time-of-flight mass spectrometer according to claim 2, wherein for each cylindrical capacitor, in addition to the slit lenses, pairs of corrective electrodes are also mounted.

4. Time-of-flight mass spectrometer according to one of the claim 1 wherein a pulser is incorporated which transforms a continuous primary beam from an ion source into a pulsed ion beam following a helical path in the capacitors.

* * * * *